Jan. 6, 1925.                                                                 1,522,441
I. GREEN, JR
AUTOMOBILE SIGNAL
Filed Jan. 25, 1922          2 Sheets-Sheet 1
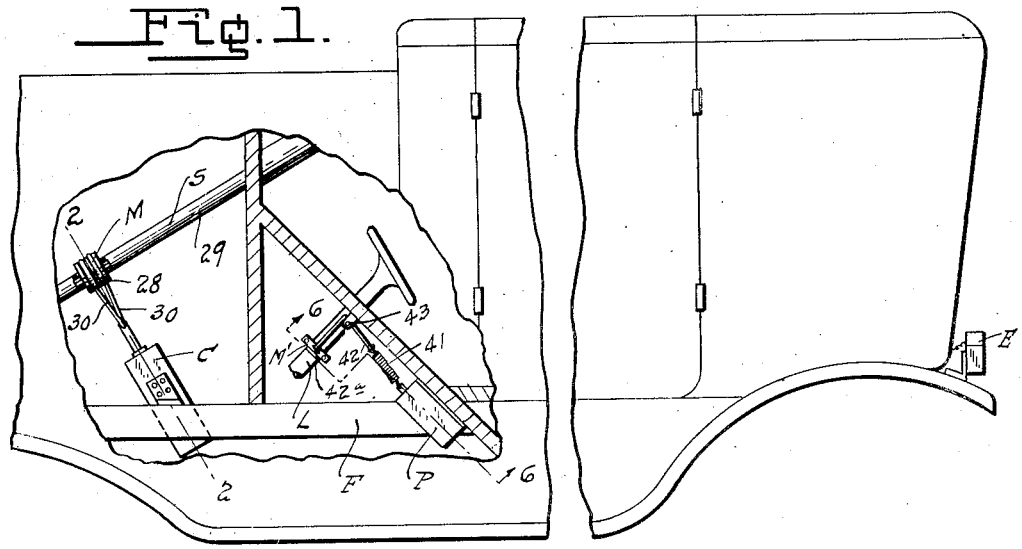
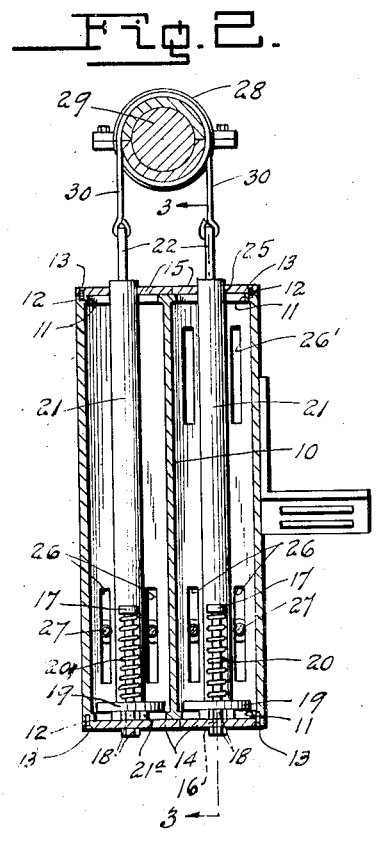   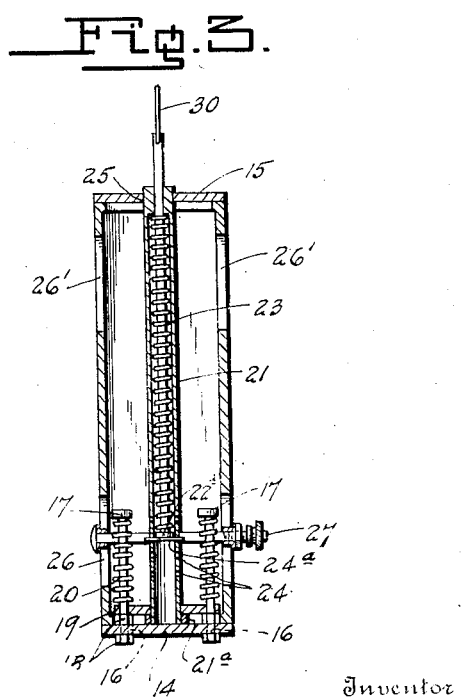
Inventor
Isedor Green Jr.
By Watson E. Coleman
Attorney Jan. 6, 1925.
I. GREEN, JR
1,522,441
AUTOMOBILE SIGNAL
Filed Jan. 25, 1922      2 Sheets-Sheet 2
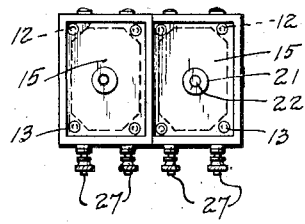
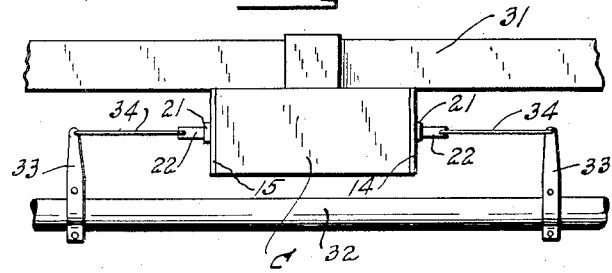
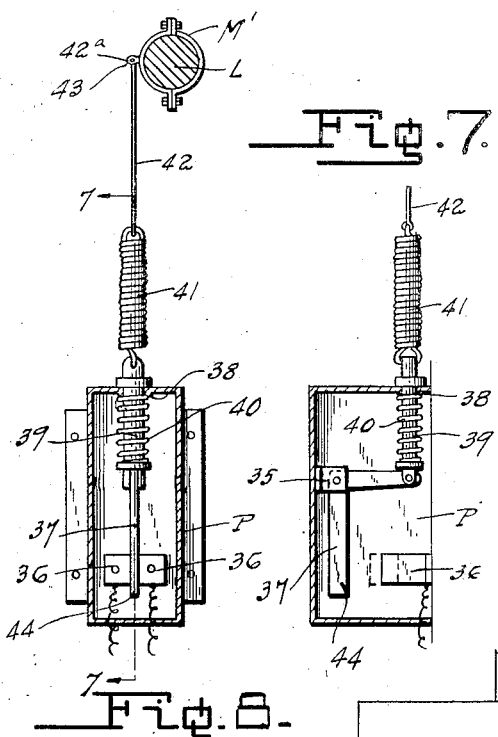
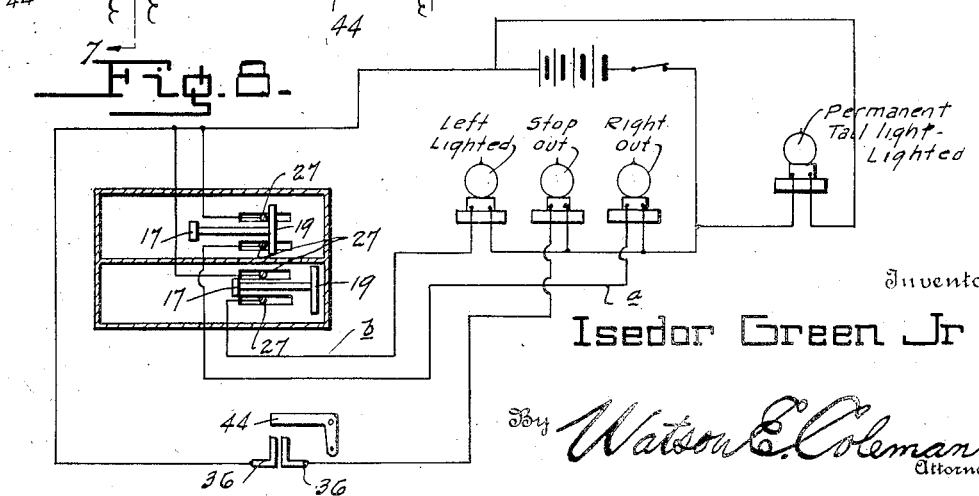
Inventor
Isedor Green Jr
By Watson E. Coleman
Attorney Patented Jan. 6, 1925.

1,522,441

UNITED STATES PATENT OFFICE.

ISEDOR GREEN, JR., OF HUNTINGTON, WEST VIRGINIA.

AUTOMOBILE SIGNAL.

Application filed January 25, 1922. Serial No. 531,759.

*To all whom it may concern:*

Be it known that I, ISEDOR GREEN, Jr., a citizen of the United States, residing at Huntington, in the county of Cabell and State of West Virginia, have invented certain new and useful Improvements in Automobile Signals, of which the following is a specification, reference being had to the accompanying drawings.

This invention relates to automobile signals and more particularly to an automatically actuated signal for indicating the operations of the driver of the vehicle to which it is attached.

An important object of the invention is to provide in a device of this character a novel and efficient operating mechanism whereby the normal action of the operator in controlling the vehicle is expressed by a series of light signals at convenient location, as for example, the rear end of the vehicle.

A further object of the invention is to provide an operating mechanism of this character with particular respect to the direction control of the vehicle which may be operated either from the rotatable steering post usually employed in automobiles, or from some part of the automobile which moves simultaneously with the movement of the wheels, as for example, the rod connecting the spindle arms of the steering wheels, and to provide an operating mechanism which may be readily altered so that it may be attached at either point.

A further object of the invention is to provide a device of this character which is extremely simple in construction and positive in its operation, and which in itself provides against extraordinary movement on the part of the operating mechanism with which it is associated.

A still further object is to provide a similar device for operation by a lever which is shifted in stopping the automobile, in order that the intention of the operator to stop may be designated.

Other objects and advantages of the invention will become apparent throughout the course of the following description.

In the accompanying drawings, wherein for the purpose of illustration I have shown a preferred embodiment of my invention, and wherein like reference characters designate like parts throughout:—

Figure 1 is a fragmentary side elevation of an auto showing a signal and control therefor applied to the automobile;

Figure 2 is a section on the line 2—2 of Figure 1;

Figure 3 is a section on the line 3—3 of Figure 2;

Figure 4 is a plan view of the control box;

Figure 5 is a fragmentary plan view showing the manner of mounting the control box on the front axle;

Figure 6 is a section on the line 6—6 of Figure 1;

Figure 7 is a section on the line 7—7 of Figure 6;

Figure 8 is a wiring diagram showing one manner of connecting the control mechanism with a signal.

Referring now more particularly to the drawings, F designates the frame of the automobile, S a steering control member and L a shiftable lever operating to assist in the checking movement of the machine. Upon the frame of the automobile, I mount a control box C and a control plate P, each having an interrupted connection with one of the lights of a signal, and upon the steering element S and shiftable lever L, I secure operating mechanisms M and M' for controlling the operation of the control box C and control plate P so that when the steering device or lever is operated, said operation is indicated at the signal element E.

The control box C comprises a casing divided centrally and longitudinally into compartments by a wall 10, the ends of the compartments having openings 11 formed therein and having at the sides of these openings similarly arranged screw threaded openings 12. These screw threaded openings are adapted for the reception of securing elements 13 by means of which are attached to the ends of the compartments, closure plates 14 or 15 as the case may be, the closure plates being interchangeable with one another. The closure plate 14, hereinafter to be referred to as the bottom closure plate, has formed therein openings 16 through which extend headed elements 17 which are held in position by lock nuts 18. A plate is provided as at 19 having apertures through which the headed elements 17 extend and springs 20 surround the headed elements intermediate the heads thereof and of the plate 19, and normally force the plate 19 toward the end plate 14. A tubular member 21 likewise extends through the plate 19 and is provided at its lower end with an enlargement 21ª which engages against the face of the plate 19 next adjacent the plate 14.

Within the tubular member 21 a plunger 22, having an enlarged head 22ª fitting within the tubular member, is mounted and intermediate the end of the member remote from the plate 19 and the enlarged plunger head 22ª, a spring 23 surrounds the plunger 22 normally forcing the plunger toward the lower end of the tubular member. The side walls of the tubular members are provided with a series of openings 24 adapted for the reception of stop pins 24ª which limit the downward movement of the plunger within the tubular member. The upper end of the tubular member extends through an opening 25 formed in the top of the plate 15, and the upper end of the plunger 22, adapted for attachment to an operating element.

It will of course be noted that a tubular element, the plate 19, and the associated elements are attached to each of the bottom plates 14 and attention is directed to the fact that these elements are all removable from the compartment simply by the removal of the bottom plate 14. With the bottom plate in position, it will be seen that if the plunger 22 is drawn toward the upper end of the tubular member 21, the plate 19 will be simultaneously shifted in its direction, as the spring 23 is of greater strength than the combined strength of the springs 20. When, however, the plate 19 has reached the limit of its movement, the spring 23 will be compressed within the tubular element 21 thus compensating for any unusual length of movement on the part of the operating mechanism.

Adjacent one end of the control box and the side walls of each of the compartments and in opposite sides thereof, are formed pairs of aligned slotted openings 26 through which extend contacting elements 27 suitably insulated from the control box and adjustable within the slots. One of the compartments has formed at the opposite end thereof a similar arrangement of slots 26', the purpose of which will presently appear. These contacts 27 extend entirely across the compartment upon opposite sides of the tubular member 21 and overlie the plate 19, so that when the plate 19 is elevated a predetermined distance it engages the contacts and completes the circuit therebetween.

By reference to the diagram shown in Figure 10, it will be seen that one contact of each pair is connected with one pole of a battery, and the other contact of the pair is connected in series with the light and other pole of the battery, so that when the circuit is completed the corresponding light will be lit. In this diagram the light of the circuit $a$ is shown lit and the light of the circuit $b$ is shown out, indicating for example that the driver of the vehicle intends to turn to the left.

The means employed for operating the plungers vary with the type of machine to which the device is applied. These types may, however, be divided into two subclasses in one of which the plungers are operated by the rotatable steering post and in the other of which the plungers are operated from the bar connecting the steering spindles. In the first mentioned class, a suitable mechanism for operating the plungers consists in a split pulley 28 clamped to a rotatable steering post 29 and having secured thereto flexible elements 30, one for each plunger and operatively wound upon the pulley 28 so that when the wheel is rotated in one direction, one of the elements will be tightened, and when the wheel is rotated in the opposite direction, the other of the elements will be tightened. The plunger whose element is tightened will be drawn upwardy bringing with it the associated plate 19 and completing the contact to light the corresponding light of the signal element E. It will be observed that the fact that the contact members 27 are adjustably mounted in the slots 26 will permit of variation of the point of contact. In other words, the corresponding light in the signal may be caused to glow for a short movement of the steering wheel, or for a longer movement if desired. This adjustment is necessary, in many instances, due to the fact that the steering wheel itself has considerable play and the steering shaft 29 is not operated except for actual turning movement of the wheel.

In the latter class mentioned, the control box C is secured to the steering axle 31 in any desired manner and to the connecting rod 32 of the spindles are secured arms 33. In this form the plunger of one of the compartments is inverted, that is to say, the plates 14 and 15 are transposed and the contacts 27 are transferred to the slots 26, connections being made in the usual manner. The arms 33 are secured to the connecting rod 32 at opposite ends of the control box C and each connected to a plunger 22 by a flexible element 34. It will be seen that if the connecting rod 32 is shifted longitudinally in either direction, as it will be when the wheels are turned, one of the plungers 22 will be actuated and the other remain stationary. Here again an additional advantage of the adjustment provided by the slotted mounting of the contacts is seen in that the variation in the amount of movement of the connecting rod 32 in various types of cars will necessitate the provision of a considerable adjustment, else in some instances the warning light would not be lit until the wheels had arrived at a considerable angle and in other instances they would be lit for a very slight movement of the wheels, which is generally undesirable.

In the control plate P' I have shown a slightly modified form of control for the light. This control plate preferably comprises an insulatory plate upon which are mounted a pair of plates 35 from which are mounted a pair of spaced contacts 36 connected in series with a battery and light. The plate 35 likewise forms a mounting for a bell crank connecting member 37. Upon the plate is formed an ear 38 having an opening therethrough, through which is directed a rod or plunger 39 and intermediate one arm of the bell crank and the ear 38 a spring 40 surrounds the plunger 39. The plunger 39 is connected through the medium of a spring 41 and the flexible element 42 which passes about a pulley 43 secured upon the under surface of the floor of the car, the control plate being shown in the present instance as associated with a shifting lever S controlling or operated in checking the movement of the automobile. The end of the flexible element 42 is secured to the shifting lever as at 42ª so that when the lever is shifted, the flexible element is shifted longitudinally. The spring 41 is of greater strength than the spring 40 and accordingly, longitudinal shifting of the flexible element 42 will cause the plunger 39 to be drawn through the ear and the bell crank 37 to be shifted about its pivot, bringing the end 44 thereof into engagement with the spaced contacts 36 and completing the circuit. Adjustment of the amount of throw necessary to accomplish this contact may be obtained by making the spaced contacts of greater or less length, as indicated by the dotted lines in Figure 7. The pulley 43 is employed to cause a greater travel of the plunger 39 than would ordinarily occur and it may accordingly be eliminated at any time when the ordinary travel of the shifting lever is sufficient to cause the contacts 36 to be engaged by the bell crank 37.

From the foregoing it will be seen that I have provided a signalling device which is particularly well adapted for the use for which it is intended by reason of its wide range of adjustability, provision against over-operation of the operating mechanism from which it is actuated, and simplicity in construction. It will furthermore be obvious that the modifications hereinbefore illustrated are but examples showing constructions which might be employed to accomplish the desired results and accordingly the same must not be construed as limiting.

What is claimed is:

1. In a signalling device, the combination with a receptacle having open ends and interchangeable closures for said ends, said receptacle being provided adjacent each end thereof and in opposite walls with pairs of aligned longitudinally extending slots, a pair of contacts mounted in the slots at one end of said receptacle, a plate connected with the end closure at said end and adapted to engage said contacts and complete the circuit therebetween, means normally holding said plate out of engagement with said contacts, a prime mover, and a yieldable connection between said prime mover and plate extending through an opening formed in the closure of the other end of the receptacle.

2. In a signalling device, the combination with a receptacle sub-divided to form a pair of chambers having open ends and interchangeable closures for the ends of said chambers, said chambers being each provided adjacent one end thereof and in opposite walls with pairs of aligned longitudinally extending slots, one of said chambers being provided in the other end thereof with a similar pair of slots, a pair of contacts mounted in the slots adjacent the first named end of the receptacle, the contacts of the last named chamber being interchangeable in the pairs of slots thereof, a plate connected with the end closure at one end of each of said chambers and adapted to engage said contacts and complete the circuit therebetween, means normally holding said plate out of engagement with said contacts, operating mechanism for said plate connected to the plate and extending through the closure at the opposite end of the chamber including a cylinder engaged with the plate, a plunger shiftable within the cylinder, and a spring opposing the movement of the plunger in a direction away from the plate.

3. In a signalling device, the combination with a receptacle sub-divided to form a pair of chambers having open ends and interchangeable closures for the ends of said chambers, said chambers being each provided adjacent one end thereof and in opposite walls with pairs of aligned longitudinally extending slots, one of said chambers being provided in the other end thereof with a similar pair of slots, a pair of contacts mounted in the slots adjacent the first named end of the receptacle, the contacts of the last named chamber being interchangeable in the pairs of slots thereof, a plate connected with the end closure at one end of each of said chambers and adapted to engage said contacts and complete the circuit therebetween, means normally holding said plate out of engagement with said contacts, operating mechanism for said plate connected to the plate and extending through the closure at the opposite end of the chamber including a cylinder engaged with the plate, a plunger shiftable within the sylinder, and a spring opposing the movement of the plunger in a direction away from the plate, said contacts being adjustable longitudinally of said slots.

4. In a signalling device, the combination with a receptacle sub-divided to form a pair of chambers having open ends and interchangeable closures for the ends of said chambers, said chambers being each provided adjacent one end thereof and in opposite walls with pairs of aligned longitudinally extending slots, one of said chambers being provided in the other end thereof with a similar pair of slots, a pair of contacts mounted in the slots adjacent the first named end of the receptacle, the contacts of the last named chamber being interchangeable in the pairs of slots thereof, a plate connected with the end closure at one end of each of said chambers and adapted to engage said contacts and complete the circuit therebetween, means normally holding said plate out of engagement with said contacts, operating mechanism for said plate connected to the plate and extending through the closure at the opposite end of the chamber including a cylinder engaged with the plate, a plunger shiftable within the cylinder, and a spring opposing the movement of the plunger in a direction away from the plate, said plate holding means therefor and operating means therefor being removable as a unit with the end closure to which the plate is connected.

5. In a signalling device, the combination with a receptacle sub-divided to form a pair of chambers having open ends and interchangeable closures for the ends of said chambers, said chambers being each provided adjacent one end thereof and in opposite walls with pairs of aligned longitudinally extending slots, one of said chambers being provided in the other end thereof with a similar pair of slots, a pair of contacts mounted in the slots adjacent the first named end of the receptacle, the contacts of the last named chamber being interchangeable in the pairs of slots thereof, a plate connected with the end closure at one end of each of said chambers and adapted to engage said contacts and complete the circuit therebetween, means normally holding said plate out of engagement with said contacts, operating mechanism for said plate connected to the plate and extending through the closure at the opposite end of the chamber including a cylinder engaged with the plate, a plunger shiftable within the cylinder, a spring opposing the movement of the plunger in a direction away from the plate, and means for adjusting the tension of said spring.

6. In a signalling device, a housing, a blade and operating means therefor within the housing and shiftable longitudinally thereof, said housing being provided adjacent each end thereof in opposed longitudinal walls thereof with pairs of aligned slots, a contact in the casing having its ends disposed in said slots, means for securing the contact in adjusted position within the slots, the contact being interchangeably engageable in said pairs of slots, and interchangeable end plates for the housing providing mountings for the blade and operating member.

7. In a signalling device, a housing, a blade within the housing, guides for the blade mounted upon an end plate of the housing, an operating means for the blade including a part directed through the end plate at the opposite end of the housing, a contact within the housing and interchangeably engageable with opposite ends thereof, the end plates of said housing being interchangeable.

8. In a signalling device, a control box, longitudinally shiftable blades mounted within the control box and supported by the end walls thereof, contacts within the control box for each blade, the end walls of the control box mounting one of said blades being interchangeable to thereby reverse the blade.

In testimony whereof I hereunto affix my signature.

ISEDOR GREEN, Jr.